(12) United States Patent
Fette et al.

(10) Patent No.: US 10,766,621 B2
(45) Date of Patent: Sep. 8, 2020

(54) METHOD FOR MANUFACTURING AN OVERHEAD STORAGE COMPARTMENT FOR AN AIRCRAFT CABIN

(71) Applicant: Airbus Operations GmbH, Hamburg (DE)

(72) Inventors: Marc Fette, Hamburg (DE); Ingo Roth, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 420 days.

(21) Appl. No.: 15/611,843

(22) Filed: Jun. 2, 2017

(65) Prior Publication Data
US 2017/0349288 A1    Dec. 7, 2017

(30) Foreign Application Priority Data

Jun. 3, 2016 (EP) ..................................... 16172979

(51) Int. Cl.
| | |
|---|---|
| *B32B 3/10* | (2006.01) |
| *B64D 11/00* | (2006.01) |
| *B29C 70/86* | (2006.01) |
| *B29C 70/08* | (2006.01) |
| *B29C 70/46* | (2006.01) |

(Continued)

(52) U.S. Cl.
CPC ............ *B64D 11/003* (2013.01); *B29C 65/02* (2013.01); *B29C 65/48* (2013.01); *B29C 70/081* (2013.01); *B29C 70/086* (2013.01); *B29C 70/46* (2013.01); *B29C 70/865* (2013.01); *B29C 66/12441* (2013.01); *B29C 66/5346* (2013.01); *B29C 66/7214* (2013.01); *B29C 66/7394* (2013.01); *B29L 2031/3076* (2013.01)

(58) Field of Classification Search
None
See application file for complete search history.

(56) References Cited

U.S. PATENT DOCUMENTS

| | | |
|---|---|---|
| 5,785,202 A | 7/1998 | Stephan |
| 5,900,300 A | 5/1999 | Slaven |
| 2005/0040287 A1 | 2/2005 | Stephan et al. |

FOREIGN PATENT DOCUMENTS

WO    WO-2015183248 A1 * 12/2015

OTHER PUBLICATIONS

Extended European Search Report for Application No. 16172979 dated Nov. 18, 2016.

* cited by examiner

*Primary Examiner* — Christopher M Polley
(74) *Attorney, Agent, or Firm* — Jenkins, Wilson, Taylor & Hunt, P.A.

(57) ABSTRACT

A method for manufacturing an overhead storage compartment for an aircraft cabin, including providing a shell part extending between a first end and a second end, wherein the shell part has a first edge at the first end and a second edge at the second end. A first end wall and a second end wall are provided. The shell part and the first and second end walls are assembled, wherein the first edge is attached to the first end wall and the second edge is attached to the second end wall, such that the shell part, the first end wall and the second end wall together surround an interior space. An object, to provide a simple and fast method for manufacturing an overhead storage compartment, wherein possibly little handwork is required, is achieved in that the first end wall and/or the second end wall include an undirected long fiber reinforced plastic material.

16 Claims, 4 Drawing Sheets

(51) Int. Cl.
*B29C 65/02* (2006.01)
*B29C 65/48* (2006.01)
B29C 65/00 (2006.01)
B29L 31/30 (2006.01)

METHOD FOR MANUFACTURING AN OVERHEAD STORAGE COMPARTMENT FOR AN AIRCRAFT CABIN

CROSS-REFERENCE TO RELATED APPLICATION

This application claims priority to European Patent Application EP 16172979.3 filed Jun. 3, 2016, the entire disclosure of which is incorporated herein by reference.

TECHNICAL FIELD

The present disclosure relates to a method for manufacturing an overhead storage compartment for an aircraft cabin. Another aspect of the present disclosure relates to such an overhead storage compartment for an aircraft cabin.

BACKGROUND

The method comprises providing a shell part as well as a first end wall and a second end wall, and assembling the shell part and the first and second end walls. Preferably, the shell part is curved and might include one or several portions connected to one another. The shell part extends along, preferably in parallel to, a longitudinal axis of an associated aircraft cabin between a first end and a second end, wherein the shell part partially surrounds an interior space. The shell part has a first edge at the first end and a second edge at the second end. The first edge and the second edge run transverse, preferably perpendicular, to the longitudinal axis. The first end wall and the second end wall are preferably flat which is to be understood as not generally curved, however, it might include an unevenness or irregularities. The shell part and the first and second end walls are assembled such that the first edge is attached to the first end wall and the second edge is attached to the second end wall, wherein the shell part, the first end wall and the second end wall together at least partially surround or enclose the interior space.

Methods for manufacturing an overhead storage compartment for an aircraft cabin that are known in the art are laborious and time consuming for at least the following reasons. The methods known in the art employ a honeycomb sandwich material for the shell part and for the end walls thanks to its little weight and high shear strength. The shell part and the first and second end walls are produced in a preparatory step according to common methods for the production of honeycomb sandwich structures. In a subsequent step, the shell part and the first and second end walls have to be fitted to one another and mounted to one another, which is usually carried out by brackets or by laminating layers of fiber-reinforced plastic material over the abutting edges of the shell part and the end walls. Further, all necessary fittings, reinforcements and other functional elements have to be included in the shell part and in the end walls during this assembling step. The fitting process, the mounting and the introduction of functional elements require a considerable amount of handwork and take a long time. It would be desirable to include at least the functional elements into the shell part and into the end walls during the step of pre-producing the honeycomb sandwich material, but the fragile structure of the honeycomb core requires manual work and does not allow for a combined press process.

SUMMARY

Therefore, an object of the present disclosure is to provide a simple and fast method for manufacturing an overhead storage compartment for an aircraft cabin, wherein possibly little handwork is required.

This object is achieved in that the first end wall and/or the second end wall comprise an undirected long fiber reinforced plastic material. Such undirected long fiber reinforced plastic material can be manufactured fast and easily and can be processed without any problems, so that the fitting process of the end walls with respect to the shell part can be carried out quick and simple. Metal inserts and other functional components like reinforcements can be included during a production step of pressing or extruding the material. Also, grooves can be formed into the material such that the mounting of the end walls to the shell part can be simplified. All this would not be possible with end walls made of a honeycomb sandwich material so that the method is considerably simplified and improved.

The term "undirected" in the undirected long fiber reinforced plastic material is preferably to be interpreted as "randomly oriented" or "quasi-isotropically". The term "long fiber" is to be understood as concerning fibers having an average fiber length between 10 mm and 79 mm, preferably between 25 mm and 50 mm. The long fibers are preferably carbon or glass fibers. The plastic material is preferably based on a thermoset reaction resin, such as unsaturated polyester resin, vinylester resin, epoxy resin or polyaryletheramide resin. Preferably, such undirected long fiber reinforced plastic material is a sheet molding compound (SMC) material or a bulk molding compound (BMC) material.

According to a preferred embodiment, the first end wall comprises a first groove formed so as to receive the first edge, preferably formed complementary to the first edge. The second end wall preferably comprises a second groove formed so as to receive the second edge, preferably formed complementary to the second edge. The first edge is attached to the first end wall by inserting the first edge into the first groove. Preferably, the first edge extends in the first groove in a form fit manner. Further, it might be preferred that the first edge is additionally fixed in the first groove by, e. g., an adhesive, a laminate layer, a bolt, or a snap connection. The second edge is attached to the second end wall by inserting the second edge into the second groove. Preferably, the second edge extends in the second groove in a form fit manner. Further, it might be preferred that the second edge is additionally fixed in the second groove, e. g. by an adhesive, a laminate layer, a bolt, or a snap connection. In such a way, a simple and reliable connection between the shell part and the first and second end walls is provided which can be established quickly and without further resources.

According to another preferred embodiment, the first end wall and/or the second end wall is formed of a composite material. The composite material comprises at least one first layer of the undirected long fiber reinforced plastic material and at least one second layer of a unidirectional continuous fiber reinforced plastic material. The term "continuous fiber" of the unidirectional continuous fiber reinforced plastic material is to be understood as a fiber defined by an average fiber length which is between 30 mm and 100 mm, preferably between 50 mm and 90 mm, further preferred between 60 mm and 80 mm, most preferred about 70 mm, longer than the average fiber length of the long fibers present in the same composite material. Also, it is preferred that the average fiber length of the continuous fiber is between 60% and 120%, preferably between 70% and 100%, of the greatest extension of the associated composite material. Preferably, the second layer of the unidirectional continuous fiber reinforced plastic material is a prepreg layer. Preferably, at least one second layer of the unidirectional continuous fiber reinforced plastic material is sandwiched between two first layers of the undirected long fiber reinforced plastic material. Also, several second layers with different fiber orientations of the unidirectional continuous fiber reinforced plastic material might be sandwiched between two layers of the undirected long fiber reinforced plastic material, in order to adapt the composite material to specific load cases. By such composite material load case optimized high strength first and second side walls can be provided.

In particular, it is preferred that the composite material, preferably the entire first end wall and/or second end wall, is produced by a pressing process under application of pressure and heat, preferably by an impact extrusion process. The pressing process preferably requires that at least one first semi-finished layer of undirected long fiber reinforced plastic molding material and at least one second semi-finished layer of a unidirectional continuous fiber reinforced plastic molding material are placed against one another, thereby forming a semi-finished composite product. The semi-finished composite product is then deformed in a press device, preferably in an extrusion press, under the application of a predefined pressure profile and a predefined temperature profile. Preferably, at least one second semi-finished layer is sandwiched between at least two first semi-finished layers. Preferably, the pressure and temperature profiles are adapted such that the plastic molding material of the first and second semi-finished layers begins to yield. By such a method the composite material can be produced in a simple and reliable manner.

According to an alternative embodiment, the first end wall and/or the second end wall is formed of a sandwich material comprising at least two cover layers of the undirected long fiber reinforced plastic material and a core layer of foam material sandwiched between the cover layers. The cover layers preferably have the characteristics of the undirected long fiber reinforced plastic material described above, and the core layer is preferably formed of a foam material, in particular a rigid foam, but might also be formed of a honeycomb material, e.g. made of aramid. By such a sandwich material the first and second end walls can be built with a light weight and high shear strength, and functional components can be introduced easily.

In particular, it is preferred that the sandwich material, preferably the entire first end wall and/or second end wall, is produced by a pressing process under application of pressure and heat, preferably by an impact extrusion process. Preferably, the pressing process requires that two semi-finished cover layers of undirected long fiber reinforced plastic molding material and a semi-finished core layer of foam material are placed against one another such that the semi-finished core layer is sandwiched between the cover layers, thereby forming a semi-finished sandwich product, which is then deformed in a press device, preferably in an extrusion press, under the application of a predefined pressure profile and a predefined temperature profile. Preferably, the pressure and temperature profiles are chosen so that the plastic molding material of the semi-finished cover layers begins to yield. By such a method the sandwich material can be produced easily and reliably.

Further, it is preferred that the press device comprises a first tool part and a second tool part. The first tool part and the second tool part together form a cavity in which the semi-finished sandwich product is received. In other words, the first and second tool parts are movable between a closed setting where the first and second tool parts enclose a cavity, and an open setting where the cavity is open to the environment. The first and second tool parts are moved relatively against one another in order to press together, i. e. apply pressure to, and deform the semi-finished sandwich product. Preferably, the press device comprises a distance control device, in particular a stopper, defining the minimum distance between the first and second tool parts, and thus defining the minimum dimensions of the cavity. The distance control device is configured such that at a minimum distance between the first and second tool parts a mold pressure is between a minimum processing pressure of the semi-finished cover layers and a limit pressure maximum allowable for the semi-finished core layer not to be destroyed. In particular, the relative movement of the tool parts against one another is controlled such that the tool parts are slowed shortly before the distance control device stops the movement. By such distance control device it is guaranteed that the mold pressure is sufficient for the semi-finished cover layers, in particular for the plastic molding material, to be deformed and yield if desired, while at the same time the mold pressure is not so high that the foam material of the core layer would be destroyed.

According to another alternative embodiment, the first end wall and/or the second end wall is formed of a homogeneous material including the undirected long fiber reinforced plastic material, i. e. including only the undirected long fiber reinforced plastic material and no second material component. Such a homogeneous material provides a very simple and easy to handle solution for the first and second end walls.

In particular, it is preferred that the homogenous material, preferably the entire first end wall and/or second end wall, is produced by a pressing process under application of pressure and heat, preferably by an impact extrusion process, wherein a semi-finished product of undirected long fiber reinforced plastic molding material is deformed in a press device, preferably in an extrusion press, under application of a predefined pressure profile and a predefined temperature profile. Preferably, the pressure and temperature profiles are chosen such that the plastic molding material of the semi-finished product begins to yield. By such a process the homogeneous material can be produced in a fast, easy and reliable manner.

According to a preferred embodiment, the shell part is formed of a honeycomb sandwich material comprising a honeycomb core layer sandwiched between fiber composite cover layers. In such a way, the shell part is formed according to the prior art material, and only the end walls are formed of an undirected long fiber reinforced plastic material, which represents a very simple example of the present disclosure.

According to an alternative embodiment, the shell part is formed of the same material as the first end wall and/or the second end wall. In such a way, the material of the shell part can be formed in the same manner and with the same process as the end walls. In any case, the shell part can be formed of any of the composite material, the sandwich material and the homogeneous material.

According to a further preferred embodiment, reinforcement ribs are provided at a surface of the shell part and/or of the first end wall and/or of the second end wall. The reinforcement ribs are preferably formed by the press device during the pressing process. It might also be preferred that the sandwich material is formed such that the core layer is present in an area of the ribs, but is not present in an area between adjacent ribs where the cover layers are joined together monolithically. By such reinforcement ribs the end walls and/or the shell part can be selectively reinforced and adapted to specific load cases. The reinforcement ribs can be produced easily during the pressing process by the shape of the tool parts of the press device, i.e. by the shape of the cavity.

According to yet a further preferred embodiment, one or more metal inserts and/or one or more semi-finished reinforcement layers of preimpregnated unidirectional continuous fibers are included in the semi-finished product before the pressing process. Such metal inserts may be fitting parts for attaching the overhead storage compartment in an aircraft cabin, screw threads, projections and the like. The semi-finished reinforcement layers may be so-called tailored fiber placement (TFP) patches which serve for reinforcement of specifically loaded locations. Such metal inserts and semi-finished reinforcement layers can be included in the semi-finished composite product, in the semi-finished sandwich product and in the semi-finished product before the pressing process and be joined to the semi-finished product during the pressing process in the press device, so that their application can be automated and does not need to be carried out by hand.

A further aspect of the present disclosure relates to an overhead storage compartment for an aircraft cabin, which can be manufactured by the method according to the disclosure herein. The overhead storage compartment comprises the same features, properties and advantages as described in connection with the method for manufacturing the overhead storage compartment according to the disclosure herein.

In particular, the overhead storage compartment comprises a shell part, a first end wall and a second end wall. The shell part extends along, preferably in parallel to, a longitudinal axis between a first end and a second end and partially surrounds an interior space. Preferably, the shell part is curved and might include one or several portions connected to one another. The shell part has a first edge at the first end and a second edge at the second end, wherein the first edge and the second edge run transversely, preferably perpendicular, to the longitudinal axis. The first end wall and the second end wall are preferably flat, which means they are not generally curved but might include unevenness or irregularities. The first end wall is attached to the first edge and the second end wall is attached to the second edge, such that the shell part, the first end wall and the second end wall together at least partially surround or enclose the interior space. The first end wall and/or the second end wall comprises an undirected, in particular randomly oriented, long fiber reinforced plastic material, in particular a sheet molding compound (SMC) material or a bulk molding compound (BMC) material.

As described in connection with the method according to the present disclosure, the first end wall and/or the second end wall may be formed of a composite material comprising at least one first layer of the undirected long fiber reinforced plastic material and at least one second layer of a unidirectional continuous fiber reinforced plastic material. Alternatively, the first end wall and/or the second end wall may be formed of a sandwich material comprising at least two cover layers of the undirected long fiber reinforced plastic material and a core layer of foam material sandwiched between the cover layers. Further alternatively, the first end wall and/or the second end wall may be formed of a homogeneous material including only the undirected long fiber reinforced plastic material, but no second material component. Also, metal inserts and/or reinforcement layers of unidirectional continuous fiber reinforced plastic material may preferably be included in the shell part and/or in the first end wall and/or in the second end wall.

According to a preferred embodiment, the first end wall comprises a first groove, and the second end wall comprises a second groove. The first groove is formed so as to receive the first edge, preferably complementary to the first edge. The second groove is formed so as to receive the second edge, preferably complementary to the second edge. The first edge extends into the first groove, and the second edge extends into the second groove, preferably in a form fit manner. The grooves and/or the edges preferably extend continuously along the circumference of the shell part. Preferably, the first edge might be additionally fixed in the first groove, and/or the second edge might be additionally fixed in the second groove, by an adhesive, a laminate layer, a bolt or a snap connection.

BRIEF DESCRIPTION OF THE DRAWINGS

In the following, embodiments of the present disclosure are described in more detail by a drawing. The drawing shows in.

DETAILED DESCRIPTION

Figure 1:
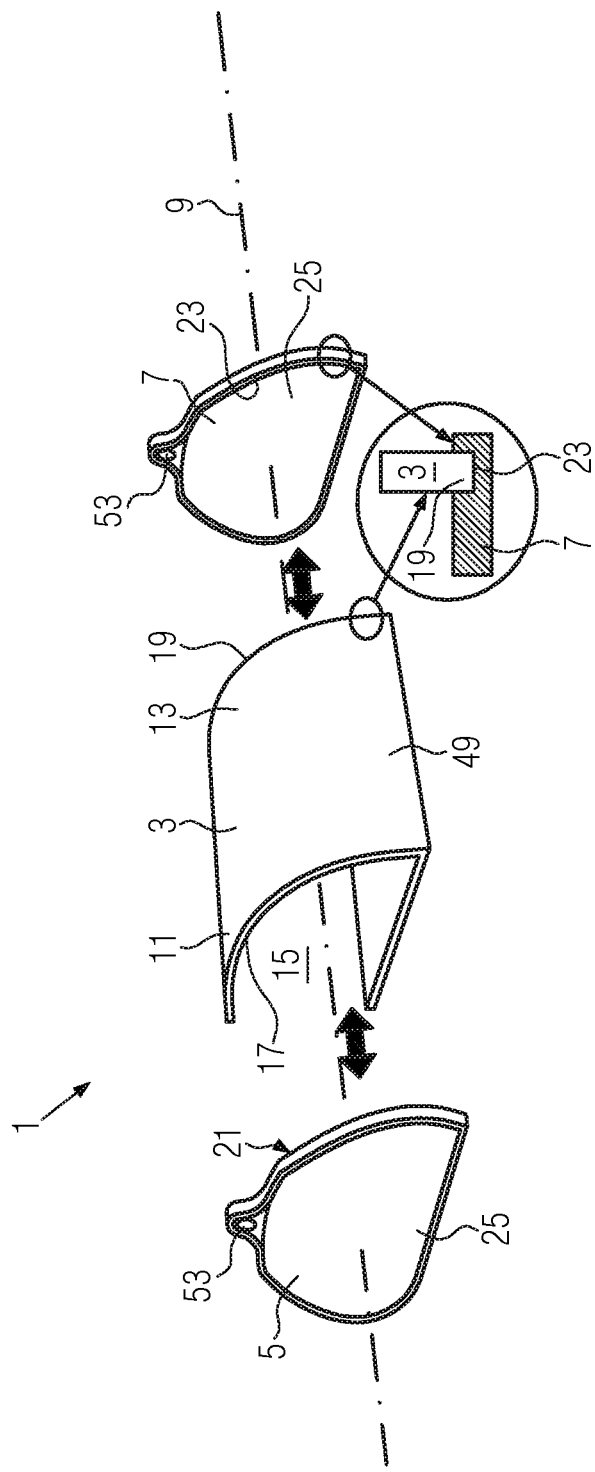
FIG. 1 a perspective view of a first embodiment of the method for manufacturing an overhead storage compartment for an aircraft cabin according to the present disclosure.

As shown in FIG. 1, the method for manufacturing an overhead storage compartment 1 for an aircraft cabin requires providing a shell part 3, a first end wall 5 and a second end wall 7, and assembling the shell part 3 and the first and second end walls 5, 7. The shell part 3 is curved and extends along a longitudinal axis 9 between a first end 11 and a second end 13, such that the shell part 3 partially surrounds an interior space 15. The shell part 3 has a first edge 17 at the first end 11 and a second edge 19 at the second end 13. The first edge 17 and the second edge 19 run transversely to the longitudinal axis 9. The first and second end walls 5, 7 are generally flat and extend transversely to the longitudinal axis 9.

When the shell part 3 and the first and second end walls 5, 7 are assembled, the first edge 17 is attached to the first end wall 5, and the second edge 19 is attached to the second end wall 7, such that the shell part 3, the first end wall 5 and the second end wall 7 together at least partially surround the interior space 15. The first end wall 5 comprises a first groove 21 formed complementary to the first edge 17 and the second end wall 7 comprises a second groove 23 formed complementary to the second edge 19. The first edge 17 is attached to the first end wall 5 by inserting the first edge 17 into the first groove 21 so that the first edge 17 extends in the first groove 21 in a form fit manner. The second edge 19 is attached to the second end wall 7 by inserting the second edge 19 into the second groove 23 so that the second edge 19 extends in the second groove 23 in a form fit manner. The first edge 17 is additionally attached in the first groove 21 by an adhesive, and the second edge 19 is additionally attached in the second groove 23 by an adhesive.

In the embodiment shown in FIG. 1, the shell part 3 and the first and second end walls 5, 7 are preproduced and precured before being assembled. However, it is also possible that the shell part 3 and the first and second end walls 5, 7 are formed and cured integrally.

Figure 2:
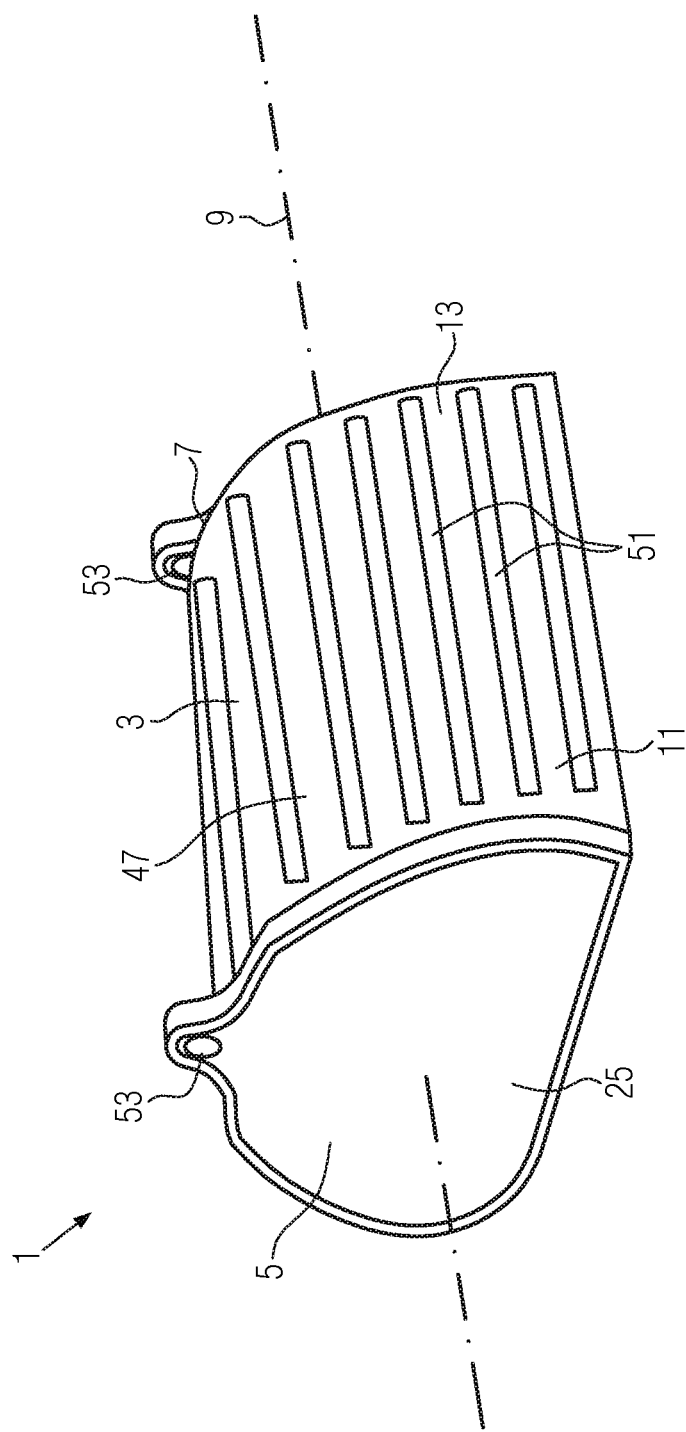
FIG. 2 a perspective view of a first embodiment of an overhead storage compartment for an aircraft cabin according to the present disclosure.

FIG. 2 shows an overhead storage compartment 1 for an aircraft cabin which has been produced by a method according to the present disclosure, in particular by a method similar to the one described in connection with FIG. 1. The overhead storage compartment 1 comprises a shell part 3 extending along a longitudinal axis 9 between a first end 11 and a second end 13, wherein the shell part 3 partially surrounds an interior space 15. The shell part 3 has a first edge 17 at the first end 11 and a second edge 19 at the second end 13, wherein the first edge 17 and the second edge 19 run transversely to the longitudinal axis 9. The overhead storage compartment 1 further comprises a first end wall 5 and a second end wall 7. The first end wall 5 comprises a first groove 21 formed complementary to the first edge 17, and the second end wall 7 comprises a second groove 23 formed complementary to the second edge 19. The first edge 17 extends into the first groove 21, and the second edge 19 extends into the second groove 23 in a form fit manner, so as to attach the first end wall 5 to the first edge 17 and the second end wall 7 to the second edge 19. In such a way, the shell part 3, the first end wall 5 and the second end wall 7 together partially surround the interior space 9.

The first end wall 5 and the second end wall 7 of the overhead storage compartment 1 as shown in FIG. 1 and in FIG. 2 comprise an undirected long fiber reinforced plastic material, in particular a sheet molding compound (SMC) material. Specifically, the first and second end walls 5, 7 are formed of a composite material 25 including a first layer 27 of the undirected long fiber reinforced plastic material and a second layer 29 of a unidirectional continuous fiber reinforced plastic material. In particular, the composite material 25 comprises several second layers 29 sandwiched between two first layers 27.

Figure 3:
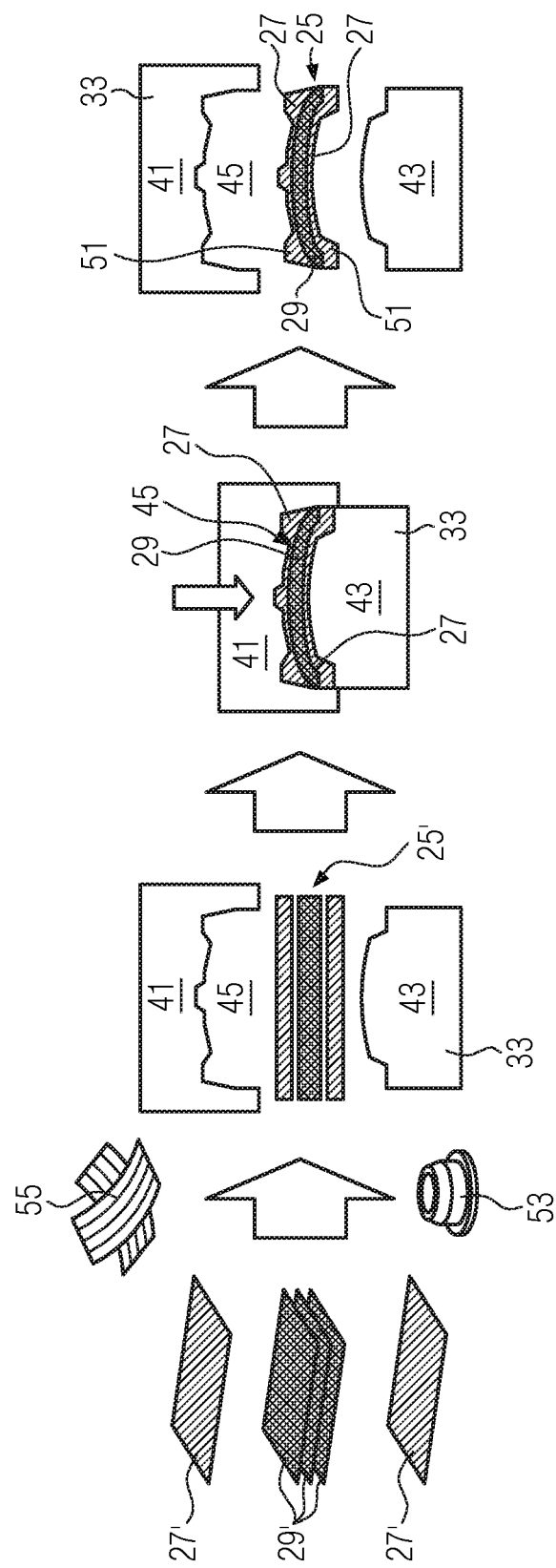
FIG. 3 an illustration of the steps required for producing the composite material employed according to a further embodiment of the method for manufacturing an overhead storage compartment for an aircraft cabin according to the present disclosure.

As shown in FIG. 3, the composite material 25 of the first and second end walls 5, 7 can be produced by a pressing process under the application of pressure and heat, specifically by an impact extrusion process. As shown in FIG. 3, two first semi-finished layers 27' of an undirected long fiber reinforced plastic molding material and several second semi-finished layers 29' of a unidirectional continuous fiber reinforced plastic molding material are placed against one another such that the second semi-finished layers 29' are sandwiched between the first semi-finished layers 27', thereby forming a semi-finished composite product 25'. The semi-finished composite product 25' is then deformed in a press device 33, specifically in an extrusion press, under the application of predefined pressure and temperature profiles.

Figure 4:
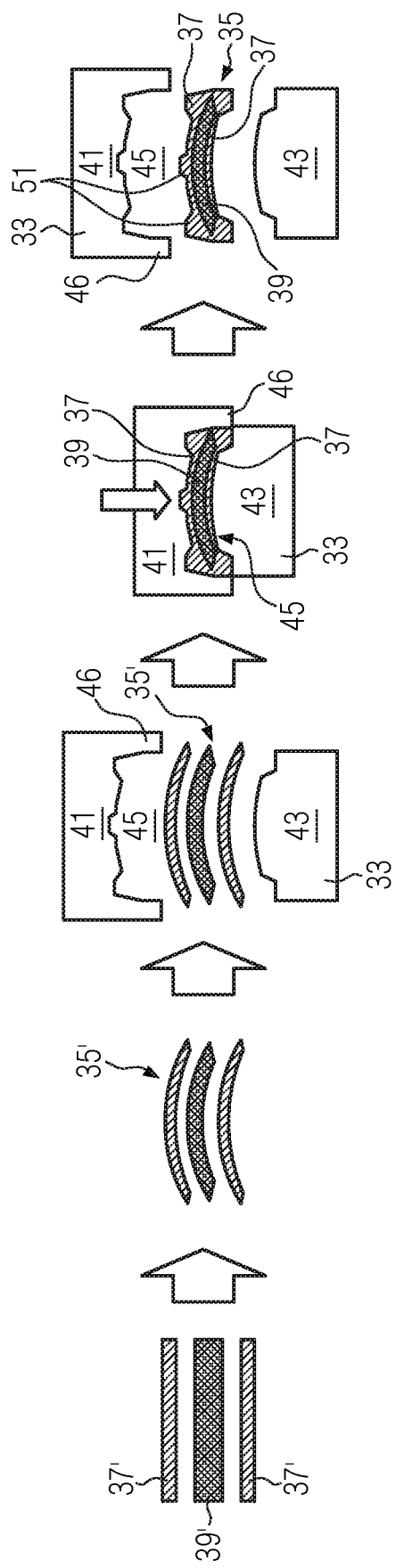
FIG. 4 an illustration of the steps required for producing the sandwich material employed according to yet a further embodiment of the method for manufacturing an overhead storage compartment for an aircraft cabin according to the present disclosure.

One alternative for the composite material 25 of the first and second end walls 5, 7 is a sandwich material 35 comprising two cover layers 37 of the undirected long fiber reinforced plastic material and a core layer 39 of a foam material sandwiched between the cover layers 37. As shown in FIG. 4, the sandwich material 35 of the first and second end walls 5, 7 can be produced by a pressing process under the application of pressure and heat, specifically by an impact extrusion process. FIG. 4 shows that two semi-finished cover layers 37' of undirected long fiber reinforced plastic molding material and a semi-finished core layer 39' of foam material are placed against one another such that the semi-finished core layer 39' is sandwiched between the semi-finished cover layers 37', thereby forming a semi-finished sandwich product 35'. The semi-finished sandwich product 35' is then deformed in a press device 33, specifically in an extrusion press, under application of a predefined pressure profile and a predefined temperature profile.

In case of both the pressing process shown in FIG. 3 and the pressing process shown in FIG. 4, the press device 33 comprises a first tool part 41 and a second tool part 43 together forming a cavity 45 in which the semi-finished composite or sandwich product 25', 35' is received. In order to apply pressure and deform the semi-finished composite or sandwich product 25', 35', the first and second tool parts 41, 43 are moved relatively against one another. At least in case of the pressing process shown in FIG. 4, the press device 33 preferably further comprises a distance control device 46 in the form of a stopper, defining the minimum distance between the first and second tool parts 41, 43. The distance control device 46 is configured such that at a minimum distance between the first and second tool parts 41, 43 a mold pressure is between a minimum processing pressure of the semi-finished cover layers 37' and a limit pressure maximum allowable for the semi-finished core layer 39' not to be destroyed.

A third possible alternative for the material of the first and second end walls 5, 7 would be a homogeneous material 47 including only the undirected long fiber reinforced plastic material without any further material component. The homogeneous material 47 can be produced by a not illustrated pressing process similar to the ones shown in FIG. 3 and FIG. 4 under the application of pressure and heat, specifically by an impact extrusion process. The pressing process requires that a semi-finished product of undirected long fiber reinforced plastic molding material is deformed in a press device 33, specifically in an extrusion press, under application of predefined pressure and temperature profiles.

In the embodiment shown in FIG. 1 the shell part 3 is formed of a honeycomb sandwich material 49 comprising a honeycomb core layer sandwiched between fiber composite cover layers. Alternatively, the shell part 3 can also be formed of any of the before-described composite material 25, sandwich material 35 and homogeneous material 47 used for the first and second end walls 5, 7. For instance, in the embodiment shown in FIG. 2 the shell part 3 is formed of the homogeneous material 47.

Specifically in the case of the homogeneous material 47, but also in the case of the composite material 25 and the sandwich material 35, reinforcement ribs 51 may be provided at a surface of the shell part 3, the first end wall 5 or the second end wall 7. Such reinforcement ribs 51 are illustrated e.g. in FIG. 2 at the shell part as well as in FIG. 3 and FIG. 4.

In any of the afore-described embodiments, one or more metal inserts 53, such as fitting parts, or one or more semi-finished reinforcement layers 55 of preimpregnated unidirectional continuous fibers, such as tailored fiber placement patches, can be included in the semi-finished composite product 25', in the semi-finished sandwich product 35' and in the semi-finished product 47' before the pressing process, such that they are included in the composite material 25, the sandwich material 35 or the homogeneous material 47 already when the material is readily produced, i.e. before the overhead storage compartment 1 is assembled. Such metal insert 53 and such semi-finished reinforcement layer 55 are illustrated in FIG. 3.

By the method according to the present disclosure a considerably simple and resistant overhead storage compartment 1 for an aircraft cabin can be manufactured in a very simple and fast way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing an overhead storage compartment for an aircraft cabin, the method comprising:
   providing a shell part extending along a longitudinal axis between a first end and a second end, the shell part partially surrounding an interior space, the shell part comprising a first edge at the first end and a second edge at the second end, the first edge and the second edge being disposed transverse to the longitudinal axis;
   providing a first end wall and a second end wall; and
   assembling the shell part and the first and second end walls, wherein the first edge is attached to the first end wall and the second edge is attached to the second end wall, such that the shell part, the first end wall and the second end wall together at least partially surround the interior space,
   wherein the first end wall or the second end wall comprise an undirected long fiber reinforced plastic material;
   wherein the first end wall comprises a first groove formed in a surface of the first end wall to receive the first edge,
   wherein the second end wall comprises a second groove formed in a surface of the second end wall to receive the second edge,
   wherein the first edge is attached to the first end wall by inserting the first edge into the first groove, and
   wherein the second edge is attached to the second end wall by inserting the second edge into the second groove.

2. The method according to claim 1, wherein the first groove is formed complementary to the first edge so as to receive the first edge in a form fit manner,
   wherein the second groove is formed complementary to the second edge to receive the second edge in a form fit manner.

3. The method according to claim 1, wherein the first end wall or the second end wall is formed of a composite material comprising at least one first layer of the undirected long fiber reinforced plastic material and at least one second layer of a unidirectional continuous fiber reinforced plastic material.

4. The method according to claim 3, wherein the composite material is produced by a pressing process under application of pressure and heat,
   wherein at least one first semifinished layer of undirected long fiber reinforced plastic molding material and at least one second semifinished layer of a unidirectional continuous fiber reinforced plastic molding material are placed against one another, thereby forming a semifinished composite product, which is then deformed in a press device under application of predefined pressure and temperature profiles.

5. The method according to claim 4, wherein one or more metal inserts or one or more semifinished reinforcement layers of preimpregnated unidirectional continuous fibers are included in the semifinished composite product, in the semifinished sandwich product and in the semifinished product before the pressing process.

6. The method according to claim 1, wherein the first end wall or the second end wall is formed of a sandwich material comprising at least two cover layers of the undirected long fiber reinforced plastic material and a core layer of a foam material sandwiched between the cover layers.

7. The method according to claim 6, wherein the sandwich material is produced by a pressing process under application of pressure and heat,
   wherein two semifinished cover layers of undirected long fiber reinforced plastic molding material and a semifinished core layer of foam material are placed against one another such that the semifinished core layer is sandwiched between the semifinished cover layers, thereby forming a semifinished sandwich product, which is then deformed in a press device under application of predefined pressure and temperature profiles.

8. The method according to claim 7, wherein the press device comprises a first tool part and a second tool part,
   wherein the first and second tool parts together form a cavity in which the semifinished sandwich product is received,
   wherein the first and second tool parts are moved relatively against one another in order to press together and deform the semifinished sandwich product,
   wherein the press device comprises a distance control device defining a minimum distance between the first and second tool parts, and
   wherein the distance control device is configured such that at the minimum distance between the first and second tool parts a mold pressure is between a minimum processing pressure of the semifinished cover layers and a limit pressure maximum allowable for the semifinished core layer not to be destroyed.

9. The method according to claim 7, wherein one or more metal inserts or one or more semifinished reinforcement layers of preimpregnated unidirectional continuous fibers are included in the semifinished composite product, in the semifinished sandwich product and in the semifinished product before the pressing process.

10. The method according to claim 1, wherein the first end wall or the second end wall is formed of a homogeneous material including the undirected long fiber reinforced plastic material.

11. The method according to claim 10, wherein the homogeneous material is produced by a pressing process under application of pressure and heat,
    wherein a semifinished product of undirected long fiber reinforced plastic molding material is deformed in a press device under application of predefined pressure and temperature profiles.

12. The method according to claim 11, wherein one or more metal inserts or one or more semifinished reinforcement layers of preimpregnated unidirectional continuous fibers are included in the semifinished composite product, in the semifinished sandwich product and in the semifinished product before the pressing process.

13. The method according to claim 1, wherein the shell part is formed of a honeycomb sandwich material comprising a honeycomb core layer sandwiched between fiber composite cover layers.

14. The method according to claim 1, wherein the shell part is formed of a same material as the first end wall or the second end wall.

15. The method according to claim 1, wherein one or more reinforcement ribs are provided at a surface of the shell part or of the first end wall or of the second end wall.

16. A method for manufacturing an overhead storage compartment for an aircraft cabin, the method comprising:
providing a shell part extending along a longitudinal axis between a first end and a second end, the shell part partially surrounding an interior space, the shell part comprising a first edge at the first end and a second edge at the second end, the first edge and the second edge being disposed transverse to the longitudinal axis;
providing a first end wall and a second end wall; and
assembling the shell part and the first and second end walls, wherein the first edge is attached to the first end wall and the second edge is attached to the second end wall, such that the shell part, the first end wall and the second end wall together at least partially surround the interior space,
wherein the first end wall or the second end wall comprise an undirected long fiber reinforced plastic material; and
wherein the first end wall or the second end wall is formed of a composite material comprising at least one first layer of the undirected long fiber reinforced plastic material and at least one second layer of a unidirectional continuous fiber reinforced plastic material.

* * * * *